US011866837B2

(12) United States Patent
Cusin et al.

(10) Patent No.: US 11,866,837 B2
(45) Date of Patent: Jan. 9, 2024

(54) METHOD FOR FABRICATION OF A METAL COMPONENT WITH AT LEAST ONE OPTICAL ILLUSION DESIGN

(71) Applicant: Nivarox-FAR S.A., Le Locle (CH)

(72) Inventors: Pierre Cusin, Villars-Burquin (CH); Alex Gandelhman, Neuchatel (CH); Michel Musy, Orpund (CH)

(73) Assignee: Nivarox-FAR S.A., Le Locle (CH)

(*) Notice: Subject to any disclaimer, the term of this patent is extended or adjusted under 35 U.S.C. 154(b) by 0 days.

(21) Appl. No.: 15/342,515

(22) Filed: Nov. 3, 2016

(65) Prior Publication Data

US 2017/0130353 A1 May 11, 2017

(30) Foreign Application Priority Data

Nov. 11, 2015 (EP) .................................... 15194158

(51) Int. Cl.

| | |
|---|---|
| ***C25D 1/00*** | (2006.01) |
| ***G04B 45/00*** | (2006.01) |
| ***C22C 19/03*** | (2006.01) |
| ***C25D 1/20*** | (2006.01) |
| ***B44F 7/00*** | (2006.01) |
| ***C25D 3/12*** | (2006.01) |

(52) U.S. Cl.

CPC .............. *C25D 1/003* (2013.01); *C22C 19/03* (2013.01); *C25D 1/00* (2013.01); *C25D 1/20* (2013.01); *G04B 45/0069* (2013.01); *G04B 45/0076* (2013.01); *B44F 7/00* (2013.01); *C25D 3/12* (2013.01)

(58) Field of Classification Search

CPC . C25D 1/003; C25D 1/00; C25D 1/20; C25D 3/12; G04B 45/0076; G04B 45/0069; G04B 45/0023; C22C 19/09; B44F 7/00

See application file for complete search history.

(56) References Cited

U.S. PATENT DOCUMENTS

| | | | | | |
|---|---|---|---|---|---|
| 2,875,543 | A | | 3/1959 | Sylvester et al. | |
| 4,445,995 | A | | 5/1984 | Wierschke | |
| 5,194,698 | A | * | 3/1993 | Souto | C25D 1/10 174/250 |
| 6,017,657 | A | * | 1/2000 | Mentz | B21H 8/005 205/70 |

(Continued)

FOREIGN PATENT DOCUMENTS

| | | | |
|---|---|---|---|
| CH | 694 466 | A5 | 1/2005 |
| EP | 0 287 746 | A1 | 10/1988 |

(Continued)

OTHER PUBLICATIONS

European Search Report dated Jul. 21, 2016 in European Application 15194158.0 filed on Nov. 11, 2015 (with English Translation of Categories of Cited Documents).

(Continued)

*Primary Examiner* — Louis J Rufo

(74) *Attorney, Agent, or Firm* — Oblon, McClelland, Maier & Neustadt, L.L.P.

(57) ABSTRACT

The invention relates to a method for fabrication of a one-piece, metal-based component of simple shape offering the illusion of faceting and/or chamfering for forming all or part of the exterior part of a timepiece.

9 Claims, 3 Drawing Sheets

(56) References Cited

U.S. PATENT DOCUMENTS

| | | | | |
|---|---|---|---|---|
| 8,314,989 | B1 * | 11/2012 | Mossberg | G02B 5/1819 359/567 |
| 9,025,247 | B1 | 5/2015 | Mossberg et al. | |
| 2002/0068148 | A1 * | 6/2002 | Nakamura | B44C 1/222 428/131 |
| 2006/0160027 | A1 * | 7/2006 | Niwa | C25D 1/10 430/312 |
| 2011/0233063 | A1 * | 9/2011 | Seki | C25D 5/022 205/70 |
| 2012/0027998 | A1 * | 2/2012 | Ibn-Elhaj | G02B 5/1857 428/161 |
| 2014/0177401 | A1 * | 6/2014 | Grossenbacher | G04D 3/0048 368/232 |
| 2014/0226449 | A1 * | 8/2014 | Fussinger | B81C 99/008 368/327 |

FOREIGN PATENT DOCUMENTS

| | | | | |
|---|---|---|---|---|
| EP | 0287746 A1 * | 10/1988 | B44C 3/042 |
| JP | 57-145990 | 9/1982 | |
| JP | 2007-240416 | 9/2007 | |
| WO | WO 2009/083487 A2 | 7/2009 | |

OTHER PUBLICATIONS

Combined Chinese Office Action and Search Report dated Aug. 14, 2020 in corresponding Chinese Patent Application No. 201610989578.3 (with English of Category of Cited Documents). 6 pages.

* cited by examiner

Fig. 6
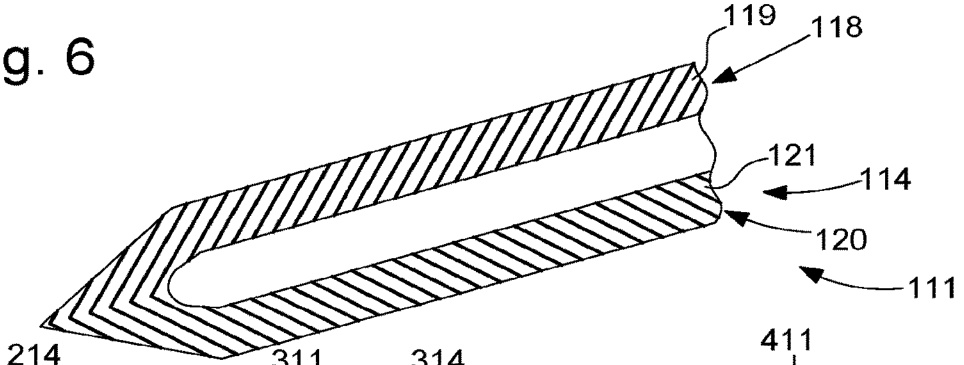
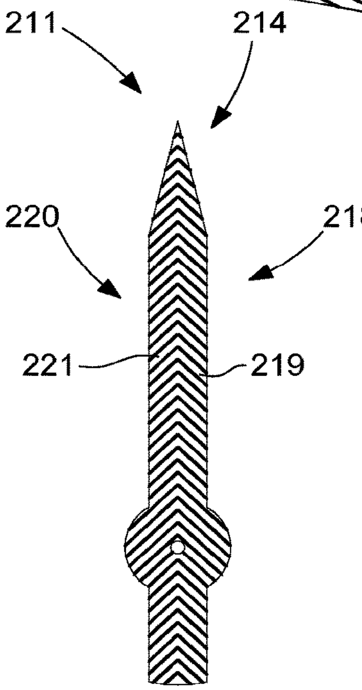
Fig. 7
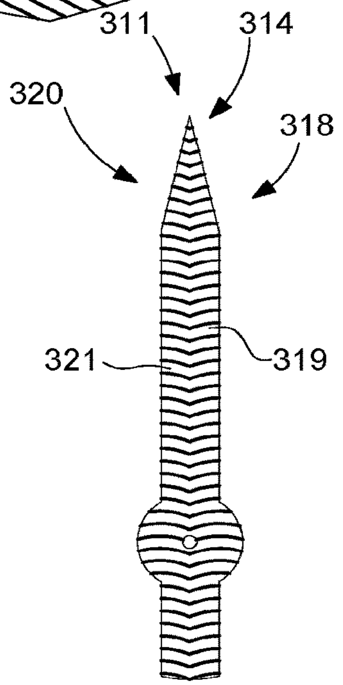
Fig. 8
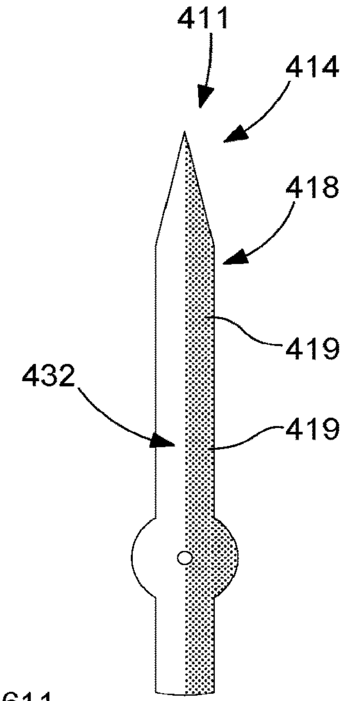
Fig. 9
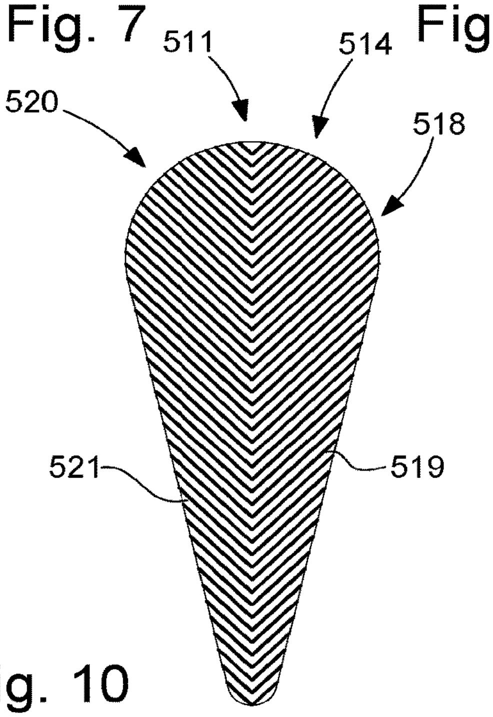
Fig. 10
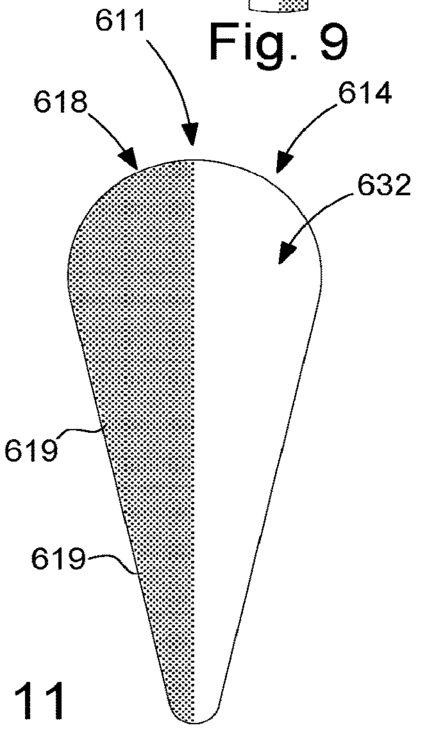
Fig. 11

METHOD FOR FABRICATION OF A METAL COMPONENT WITH AT LEAST ONE OPTICAL ILLUSION DESIGN

This application claims priority from European Patent Application No 15194158.0 of Nov. 11, 2015, the entire disclosure of which is hereby incorporated herein by reference.

FIELD OF THE INVENTION

The invention relates to a method for fabrication of a metal-based component having a flat surface comprising at least one optical illusion pattern and, more specifically, at least one pattern making the flat surface appear not to be flat.

BACKGROUND OF THE INVENTION

It is known to form external components whose upper surface is faceted and/or chamfered in order to improve the aesthetic appearance of a timepiece. EP Patent 1557729 discloses, in particular, the very great difficulty in developing a method for fabrication of faceted components that do not require finishing steps.

SUMMARY OF THE INVENTION

It is an object of the present invention to overcome all or part of the aforecited drawbacks by proposing a fabrication method that requires neither faceting nor finishing to obtain a simple metal-based component offering the illusion of faceting and/or chamfering.

To this end, the invention relates to a method for fabrication of at least one metal-based component with at least one optical illusion pattern, characterized in that it comprises the following steps:

a) forming a substrate whose flat upper surface is electrically conductive and comprises negative ribs of said at least one optical illusion pattern of said at least one component to be fabricated;

b) forming a mould on the substrate, the mould comprising at least one cavity whose base is formed by said upper surface of the substrate;

c) filling said at least one mould cavity by electrodeposition or galvanoplasty to form said at least one metal-based component with a flat surface comprising said at least one optical illusion pattern making said surface appear not to be flat;

d) releasing said at least one component thereby formed from the substrate and from the mould.

It is thus understood that, as a result of the flatness of the substrate, the fabrication method allows a component to be obtained with a flat surface that no longer needs to be subsequently faceted or, more generally, subsequently finished.

Further, the fabrication method offers very high precision of the dimensions and very high reproducibility of a same type of one-piece metal-based components, or of several different one-piece metal-based components, on the same substrate.

Finally, advantageously according to the invention, the very high precision and very high reproducibility of the fabrication method make it possible to obtain a very simple component, provided with at least one, very fine and easily reproducible pattern making a flat surface appear not to be flat, as though machined, such as by bevelling or chamfering.

In accordance with other advantageous variants of the invention:

- according to a first embodiment, the ribs form at least two series of parallel segments, the first series of parallel segments joining the second series of parallel segments at an angle comprised between 10 and 170°, such that said at least one component gives the illusion that said flat surface comprises two bevelled surfaces forming an edge;
- according to a second embodiment, the ribs form at least one series of curved segments such that said at least one component gives the illusion that said flat surface is domed.
- according to a third embodiment, the ribs form at least one series of recesses arranged symmetrically in relation to each other, said at least one series of recesses being formed adjacent to a portion wherein the upper surface of the substrate has no negative rib such that said at least one component gives the illusion that said flat surface comprises two bevelled surfaces forming an edge;
- according to a fourth embodiment, the ribs are arranged at the periphery of said at least one mould cavity and form at least two series of parallel segments, the parallel segments of the first series being perpendicular to the parallel segments of the second series and joining at an angle such that said at least one component gives the illusion that said flat surface is chamfered;
- regardless of the embodiment, the ribs can have a height comprised between 2 and 100 micrometres;
- the method further comprises, between step c) and step d), step e): selectively machining one portion of said at least one metal-based component so as to form said at least one component with a securing means;
- the upper surface of the substrate is rendered electrically conductive by doping a silicon substrate and/or by the deposition of an electrically conductive layer on a silicon substrate;
- the substrate has a thickness comprised between 0.3 and 1 mm;
- step b) comprises phase f): depositing a photosensitive resin layer on the electrically conductive upper surface of the substrate, step g): selectively illuminating one portion of the photosensitive resin, and step h): developing the photosensitive resin to form said at least one cavity of the mould;
- said at least one component is formed from a nickel or nickel-phosphorus base;
- several components are formed on the same substrate
- said at least one component forms all or part of a dial, an aperture decoration, a flange, a bezel, a push-piece, a crown, a case back cover, a hand, a bracelet or strap, a link, a clasp, a decoration, an oscillating weight or an applique.

The invention also relates to the exterior part of a timepiece comprising a metal-based component obtained by the method according to any of the preceding variants, characterized in that the component has a substantially flat surface with at least one optical illusion pattern making said flat surface appear not to be flat.

BRIEF DESCRIPTION OF THE DRAWINGS

Other features and advantages will appear clearly from the following description, given by way of non-limiting illustration, with reference to the annexed drawings, in which:

FIGS. 6 to 9 represent examples of hands obtained according to the invention;

FIGS. 10 to 15 represent examples of hour-symbols obtained according to the invention;

DETAILED DESCRIPTION OF PREFERRED EMBODIMENTS

The present invention relates to a method for fabrication of a one-piece, metal-based component of simple shape offering the illusion of faceting and/or chamfering for forming all or part of the exterior of a timepiece. By way of non-limiting example, the component may thus form all or part of a dial, an aperture decoration, a flange, a bezel, a push-piece, a crown, a case back cover, an oscillating weight, a hand, a bracelet or strap, a link, a clasp, a decoration or an applique.

Naturally, such a component is not limited to the field of horology. By way of non-limiting example, such a component could alternatively form all or part of a piece of jewellery.

The method is for fabricating at least one metal-based component. The term "metal-based" means that one or more metals may be present in the composition of the component. Thus, by way of non-limiting example, the component(s) may, for example, be formed from a nickel or nickel-phosphorus base.

Advantageously according to the invention, each metal-based component obtained by the method comprises at least one optical illusion pattern. More specifically, advantageously, each component comprises a substantially flat surface with at least one optical illusion pattern making the flat surface appear not to be flat, which allows a simple component to be obtained, for example offering the illusion of faceting and/or chamfering.

For the sake of simplification, the Figures presented represent the fabrication of only one component on a substrate. However, advantageously according to the invention, the methods enables several identical or different components to be formed on the same substrate.

Figure 1:
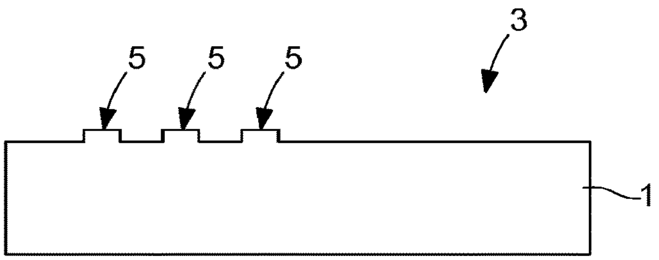
FIGS. 1 to 5 are schematic representations of steps of a method according to the invention.

As seen in FIG. 1, the method according to the invention comprises a first step a) intended to form a substrate 1 whose flat, upper surface 3 is electrically conductive and comprises negative ribs 5 of said at least one optical illusion pattern of the component to be fabricated. The general shape of said at least one optical illusion pattern will be explained further below. For reasons of intelligibility, ribs 5 are schematically represented by 3 studs projecting from the upper surface 3 of substrate 1 in FIG. 1.

A large variety of substrates 1 is possible. Preferably, the material of substrate 1 is selected for its ability to be made flat and its very low roughness, i.e. the natural feature of having a smooth surface. By way of example, a silicon-based substrate 1 has both these advantages.

In the case where substrate 1 is made of silicon, step a) may thus comprise a first phase of covering substrate 1 with a mask having openings leaving an upper portion of substrate 1 uncovered. In a second phase, an etch could be performed in the mask openings. Such an etch may be a wet or dry etch. Finally, in a third phase illustrated in FIG. 1, the mask is removed to leave only ribs 5 made on upper surface 3 of substrate 1.

In the case where substrate 1 is made of silicon, upper surface 3 of substrate 1 may be made electrically conductive by doping the silicon, i.e. by using a substrate 1 already doped prior to the etch or by doping it subsequently, and/or by the deposition of an electrically conductive layer.

Further, substrate 1 may have a thickness comprised between 0.3 and 1 mm, whereas ribs 5 may extend to a height comprised between 2 and 100 micrometres from upper surface 3 of substrate 1.

Figure 2:
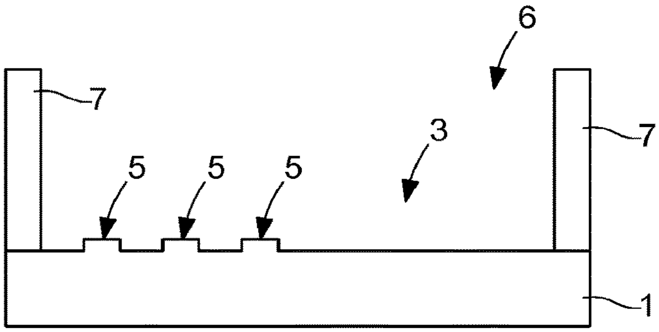

As illustrated in FIG. 2, the method continues with a second step b) for forming a mould 7 on substrate 1. It is thus understood that mould 7 comprises at least one cavity 6, whose base is formed by upper face 3 of substrate 1, i.e., depending on the desired shape of the component, one or more cavities.

Step b) preferably comprises the three phases f) to h). Step b) comprises a first phase f) for depositing a photosensitive resin layer on electrically conductive upper surface 3 of substrate 1. This phase f) may be obtained by spin coating or by spray coating. The second phase g) is for selectively illuminating one portion of the photosensitive resin. It is thus clear that, depending on the nature of the photosensitive resin, i.e. whether the resin is of a positive or negative type, the illumination will be focussed on the desired at least one future cavity 6 or on portions other than said at least one desired future cavity 6.

Finally, step b) ends with a third phase h) for developing the selectively illuminated photosensitive resin in order to form mould 7, i.e. to harden the remaining photosensitive resin around said at least one cavity 6 or between cavities 6. This third phase h) is generally obtained by a heat treatment to harden the resin followed by a development to form said at least one cavity 6.

Figure 3:
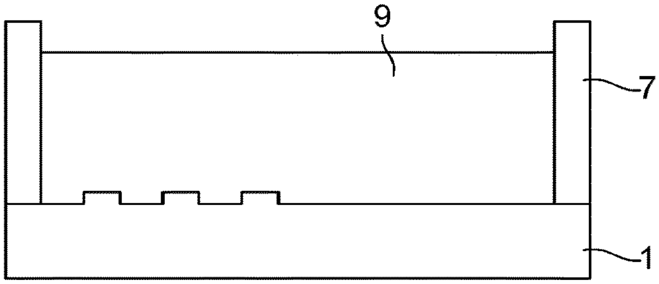

As illustrated in FIG. 3, the method continues with a third step c) for filling said at least one cavity 6 of mould 7 by electrodeposition or galvanoplasty to form the blank or the metal-based component with a flat surface comprising said at least one optical illusion pattern 14 making said surface appear not flat. According to the invention, the metal-based component has the same raised pattern In projection. However, during the structuring of substrate 1, in step c), ribs 5 will form recesses 15 on one side of the blank or of the metal-based component. Further, as is explained below, an optional step e) may also be implemented after step c).

Advantageously according to the invention, as a result of the very precise photolithography of step b), the method can produce a metal-based component 9 with high precision external and possibly internal dimensions capable of satisfying the very high tolerances required for a component in the field of horology. "Internal dimensions" means that, from a structured resin portion 7 which is inserted into said at least one cavity 6, an opening and/or a hole in the metal-based component can be directly formed in step c).

As explained above, the electrodeposition or galvanoplasty filling of each cavity 6 in step c) may, for example, be achieved with an alloy formed of nickel and phosphorus (NiP) and particularly an alloy of this type having a phosphorus proportion substantially equal to 12% (NiP12).

Finally, the method ends with a fourth and final step d) for releasing the component thereby formed from substrate 1 and from mould 7. Consequently, in the above example in which substrate 1 is made of silicon, step d) may consist of a selective etch of the silicon and a selective etch of the material of mould 7. The silicon etch may, for example, be obtained by a chemical etch using a bath comprising potassium hydroxide (known by the abbreviation KOH).

Figure 4:
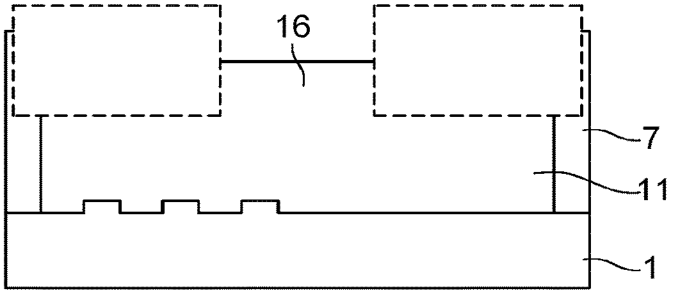
Figure 5:
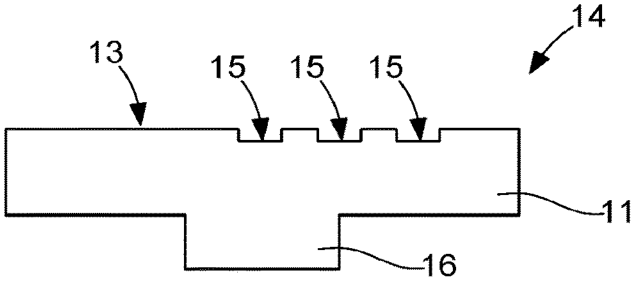
Figure 12:
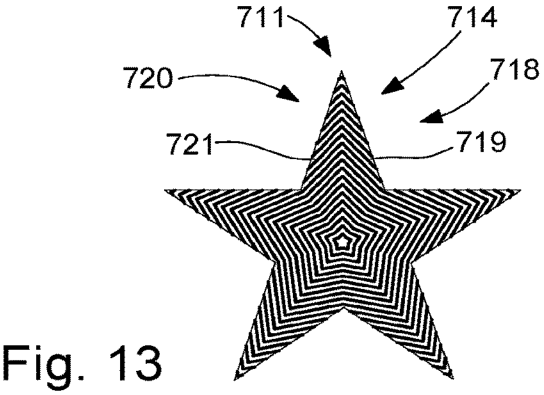

According to a variant of the invention illustrated in FIGS. 4 and 5, the method further comprises, between step c) and step d), the optional step e) for selectively machining one portion of the metal-based component in order to form a component 11 with at least one securing means 16.

As explained above, block 9, which has the same raised pattern, is then modified in thickness to form at least one securing means 16. Component 11 is thus obtained without having to form several functional levels one atop the other, or to finish the surface of the component comprising said at least one optical illusion pattern 14.

Because of the precise positioning of each block 9 on substrate 1, it is possible, in step e), to machine each block 9 when still on substrate 1, with an automated machine that can be programmed with precise dimensions. It is to be noted that, although step e) is for machining one or more blocks 9, a portion of resin 7 could also be machined by stresses caused by the size of the tools used or the volumes to be removed, as illustrated by the clear spaces visible in FIG. 4. Of course, this step e) may also make it possible to form other functional levels and/or to level mould 7 and block 9 by lapping.

It is understood therefore, that in addition to flat surface 13 and recesses 15 forming said at least one optical illusion pattern 14, component 11 may also comprise at least one securing means 16 for attaching metal-based component 11. Securing means 16 can therefore take the form of a foot or a pipe.

FIGS. 6 to 16 represent examples of components obtained by the method to better explain an optical illusion pattern according to the invention. By way of non-limiting example, four embodiments of the optical illusion pattern are explained.

According to a first embodiment, substrate 1 comprises ribs for obtaining the examples of FIGS. 6, 7, 10 and 12. The optical illusion pattern 114, 214, 514 and 714 of FIGS. 6, 7, 10 and 12, thus form at least two series 118, 120, 218, 220, 518, 520, 718, 720 of parallel segments 119, 121, 219, 221, 519, 521, 719, 721. Preferably according to the first embodiment, the first series 118, 218, 518, 718 of parallel segments 119, 219, 519, 719 join the second series 120, 220, 520, 720 of parallel segments 121, 221, 521, 721 at an angle comprised between 10 and 170° such that component 111, 211, 511, 711 gives the illusion of a visible surface with two bevelled surfaces forming an edge, when it is flat.

Figure 13:
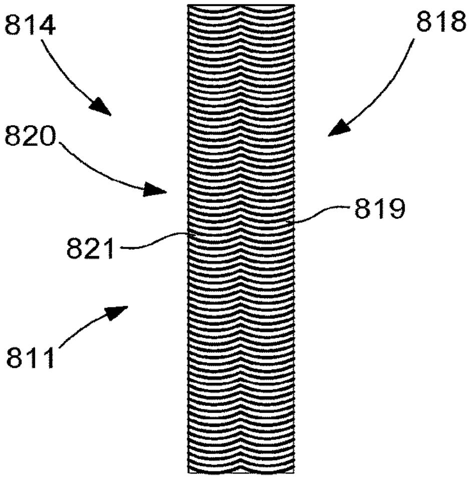
Figure 15:
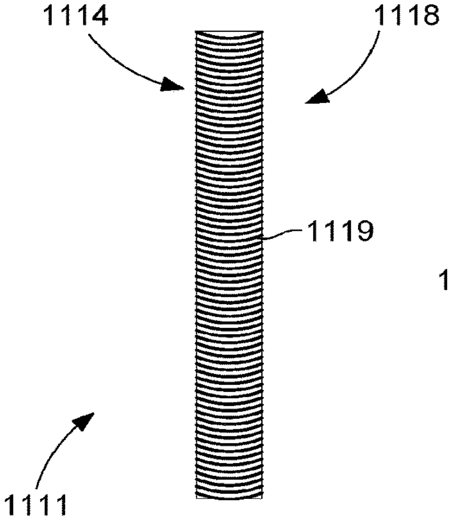

According to a second embodiment, substrate 1 comprises ribs for obtaining the examples of FIGS. 8, 13 and 15. The optical illusion pattern 314, 814 and 1114 of FIGS. 8, 13 and 15 thus form at least one series 318, 320, 818, 820, 1118 of curved segments 319, 321, 819, 821, 1119, such that said component gives the illusion of a domed visible surface when it is flat. According to a variant of the second embodiment seen in FIGS. 8 and 13, a first series 318, 818 of curved segments 319, 819 joins a second series 320, 820 of curved segments 321, 821 at an angle comprised between 10 and 170 degrees, such that said component gives the illusion of a visible surface with two domed surfaces joined to form a groove, when the visible surface is flat.

According to a third embodiment, substrate 1 comprises ribs in the form of studs for obtaining the examples of FIGS. 9 and 11. The optical illusion pattern 414 and 614 of FIGS. 9 and 11 thus form at least one series 418, 618 of recesses 419, 619, arranged symmetrically in relation to each other. Preferably according to the third embodiment, said at least one series 418, 618 of recesses is formed adjacent to a portion 432, 632 wherein the surface of component 411, 611 has no optical illusion pattern, such that said component gives the illusion of a visible surface with two bevelled surfaces forming an edge when it is flat.

As seen in FIGS. 9 and 11, recesses 419, 619 are of circular cross-section and at a regular distance from each other. Of course, the geometry and arrangement of recesses 419, 619 may differ according to the desired effect without departing from the scope of the invention.

Figure 14:
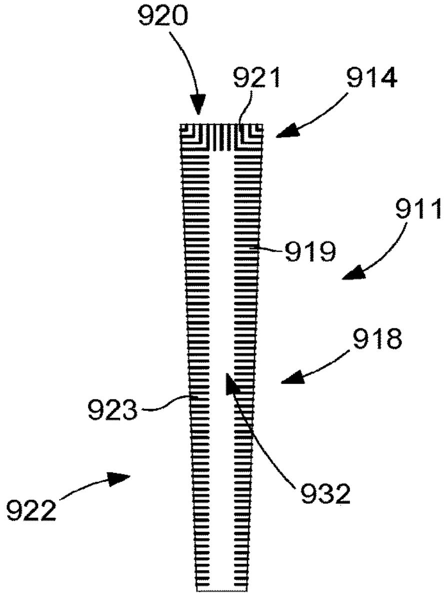
Figure 16:
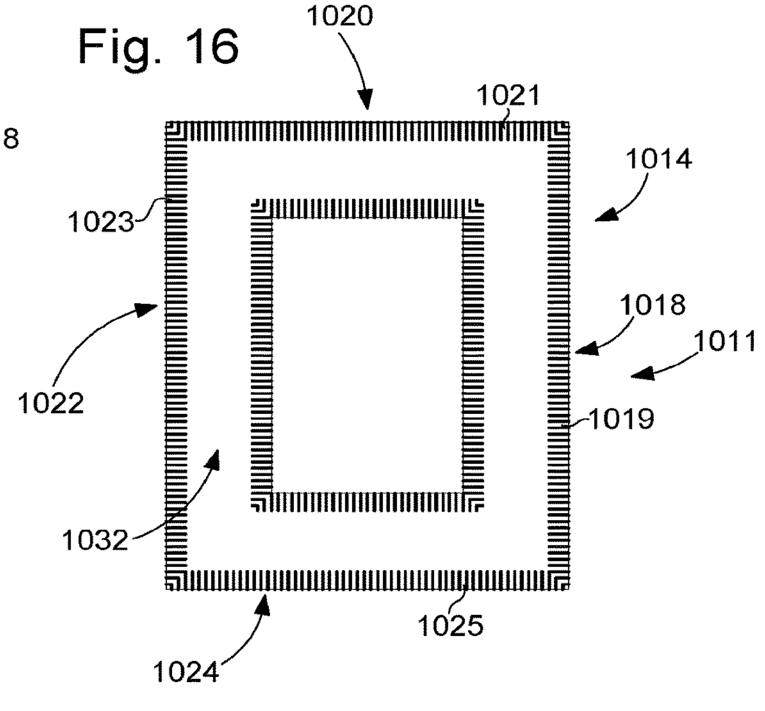
FIG. 16 represents an example of an aperture decoration obtained according to the invention.

According to a fourth embodiment, substrate 1 comprises ribs which are arranged at the periphery of the mould cavities for obtaining the examples of FIGS. 14 and 16. The optical illusion pattern 914 and 1014 of FIGS. 14 and 16 thus forms at least two series 918, 920, 922, 1018, 1020, 1022, 1024 of parallel segments 919, 921, 923, 1019, 1021, 1023, 1025, the parallel segments 919, 923, 1019, 1023 of the first series 918, 922, 1018, 1022 being perpendicular to the parallel segments 921, 1021, 1025 of the second series 920, 1020, 1024 and joining at an angle of 90 degrees, such that the component gives the illusion of a chamfered visible surface surrounding a portion 932, 1032 wherein the surface of component 911, 1011 has no optical illusion pattern.

Of course, the present invention is not limited to the illustrated example but is capable of various variants and modifications which will appear to those skilled in the art. In particular, components 1, 111, 211, 311, 411, 511, 611, 711, 811, 911, 1011, 1111 could be subject to a final hardening step, as for example disclosed in EP Patent 3009896, which is incorporated by reference in the present application.

It is also possible to envisage, alternatively, forming ribs 5 by photolithography of a photosensitive resin on the flat, upper surface of a substrate.

In a particular alternative, substrate 1 could also be chosen to form ribs 5 having a different geometry from that presented in FIGS. 1 to 4. Thus, by way of non-limiting example, substrate 1 could be made of (100)-oriented single crystal silicon and subjected to potassium hydroxide (KOH) wet etching to form etched elements whose sides are oblique and not vertical as illustrated in FIGS. 1 to 4.

Finally, the optical illusion patterns are not limited to those described above. Thus, other embodiments are possible without departing from the scope of the invention. Further, the four embodiments presented above are capable of being combined with each other, i.e. several different patterns can appear on the same component

What is claimed is:

1. A method for fabrication of at least one metal-based component with at least one optical illusion pattern, the method comprising:

forming a substrate whose flat upper surface is electrically conductive and includes negative ribs of the at least one optical illusion pattern of the at least one metal-based component to be fabricated;

forming a mould on the substrate, the mould including at least one side wall surface extending a first distance above the flat upper surface of the substrate in a first direction, the negative ribs extending above the flat upper surface a second distance wherein the first distance is greater than the second distance, at least one cavity being formed by the upper surface of the substrate, which includes the negative ribs, as a base of the cavity and the at least one side wall surface being the side surface of the at least one cavity;

filling the at least one cavity of the mould by electrodeposition on the substrate having the negative ribs to form the at least one metal-based component with a flat surface having the at least one optical illusion pattern making the surface appear not to be flat;

selectively machining one surface of the at least one metal-based component and a portion of the mould while the at least one metal-based component remains attached to the upper surface of the substrate to reduce a thickness of the metal-based component in a first region, the reduction of thickness of the at least one metal-based component forms a single securing projection extending from a remaining second region of the one surface, the remaining second region covering an entirety of the center of the at least one metal-based component, the one surface being a surface of the metal-based component opposite to the surface that includes the optical illusion pattern; and releasing the at least one metal-based component thereby formed from the substrate and from the mould, wherein the negative ribs are formed only at a periphery of the mould, and wherein the ribs are arranged only at the periphery of the at least one mould cavity, the ribs comprise at least three series of parallel segments, the parallel segments of the first series being perpendicular to the parallel segments of the second series and joining at an angle of 90 degrees, the parallel segments of the second series being perpendicular to the parallel segments of the third series and joining at an angle of 90 degrees, such that the at least one metal-based component gives the illusion that the flat surface is chamfered.

2. The method according to claim I, wherein the ribs form at least one series of curved segments such that the at least one metal-based component gives the illusion that the flat surface is domed.

3. The method according to claim 1, wherein the height of the ribs is comprised between 2 and 100 micrometres.

4. The method according to claim 1, wherein the upper surface of the substrate is rendered electrically conductive by doping a silicon substrate and/or by the deposition of an electrically conductive layer on a silicon substrate.

5. The method according to claim 1, wherein the substrate has a thickness comprised between 0.3 and 1 mm.

6. The method according to claim 1, wherein the step of forming the mould comprises the following phases:

depositing a layer of photosensitive resin on the electrically conductive upper surface of the substrate:

selectively illuminating one portion of the photosensitive resin; and developing the photosensitive resin to form the at least one cavity of the mould.

7. The method according to claim 1, wherein the at least one metal-based component is foimed from a nickel or nickel-phosphorus base.

8. The method according to claim 1, wherein several metal-based components are formed on the same substrate.

9. The method according to claim 1, wherein the at least one metal-based component forms all or part of a dial, an aperture decoration, a flange, a bezel, a push-piece, a crown, a case back cover, a hand, a bracelet or strap, a link, a clasp, a decoration, an oscillating weight or an applique.

* * * * *